United States Patent [19]
Urmston

[11] Patent Number: 5,820,807
[45] Date of Patent: Oct. 13, 1998

[54] STAGED, SEQUENTIALLY SEPARATED INJECTION MOLD METHOD FOR FORMING CONTAINER CLOSURES

[75] Inventor: Hugh Urmston, Carmel, Ind.

[73] Assignee: Alcoa Closure Systems International, Inc., Crawfordsville, Ind.

[21] Appl. No.: 7,998

[22] Filed: Jan. 16, 1998

Related U.S. Application Data

[62] Division of Ser. No. 643,929, May 7, 1996, Pat. No. 5,736,172.

[51] Int. Cl.⁶ .................................................... B29C 45/44
[52] U.S. Cl. ...................... 264/318; 264/328.1; 264/334; 249/59; 249/64; 425/556; 425/443; 425/DIG. 58
[58] Field of Search .................................... 264/318, 255, 264/328.1, 334; 425/556, 577, 809, DIG. 68, 438, 443; 249/57, 59, 64

[56] References Cited

U.S. PATENT DOCUMENTS

| | | |
|---|---|---|
| 3,247,548 | 4/1966 | Fields et al. . |
| 3,461,488 | 8/1969 | Croyle ........................................ 249/59 |
| 4,456,214 | 6/1984 | Ruck et al. . |
| 4,541,605 | 9/1985 | Kubota et al. . |
| 4,541,795 | 9/1985 | Cole ........................................... 249/59 |
| 4,771,981 | 9/1988 | Little et al. . |
| 4,919,608 | 4/1990 | Catalanotti . |
| 4,983,346 | 1/1991 | Curliss et al. ........................... 264/318 |
| 5,114,655 | 5/1992 | Cole . |
| 5,114,659 | 5/1992 | Krall ........................................ 264/318 |
| 5,133,486 | 7/1992 | Moore et al. ............................ 222/541 |
| 5,217,731 | 6/1993 | Fallent . |
| 5,340,304 | 8/1994 | Nakamura ................................ 425/577 |
| 5,403,179 | 4/1995 | Ramsey . |
| 5,470,221 | 11/1995 | Gaiser . |
| 5,540,582 | 7/1996 | Catalanotti et al. . |
| 5,735,426 | 4/1998 | Babcock et al. ......................... 222/541 |

*Primary Examiner*—Jill L. Heitbrink
*Attorney, Agent, or Firm*—Rockey, Milnamow & Katz, Ltd.

[57] ABSTRACT

A staged, sequentially separated injection molding apparatus for forming a molded container closure includes a mold base portion, a plurality of concentric, separable telescopic mold elements, and an opening therein defined by one of the base portion and the mold elements for injecting a mold material into the apparatus. The elements are configured such that they can be separated or removed from the mold, from the inner most element outward, to provide sufficient free space for the newly molded part to flex inward as the mold elements are removed. The inward flexing of the part, permits ready removal of the next outwardly most mold element, while minimizing the possibility of damage to the molded part. Each of the mold elements includes a mold face, which in conjunction with the base portion, in part defines a mold cavity. The inner and outer mold elements and the intermediate mold element include flange portions opposite of their respective mold faces. The elements include recesses therein, and the intermediate element includes openings therethrough, adapted to receive a movable, locking cam member positioned in the opening. The cam member is adapted to hold the intermediate mold element against movement relative to the outer mold element as the inner mold element is moved away from the base portion, and to release the intermediate element with the inner element relative to the base portion, to facilitate staged, sequential opening of the mold for removal of the molded part.

6 Claims, 7 Drawing Sheets

STAGED, SEQUENTIALLY SEPARATED INJECTION MOLD METHOD FOR FORMING CONTAINER CLOSURES

CROSS-REFERENCED TO RELATED APPLICATION

The present application is a division of application Ser. No. 08/643,929, filed May 7,1996, now U.S. Pat. No. 5,736,172.

FIELD OF THE INVENTION

This invention pertains to injection molds and more particularly to a staged, sequentially separated apparatus for injection molding of container closures.

BACKGROUND OF THE INVENTION

Injection molding of plastic materials is well known in the art. Such molding techniques are well suited for forming a wide variety of parts at relatively low cost. Injection molding is particularly useful for forming large quantities of discrete items.

Certain types of container closures are well suited to be formed by injection molding. One such closure is of the type commonly referred to as a gable spout closure. This type of closure is used on containers, such as cartons and the like, which have a gable-shaped top spout. Such cartons will be recognized as those containers in which quarts and half-gallons of milk or juice are packaged.

In an injection molding apparatus, a steel or other metallic mold of the item to be molded is first made. The mold contains a mold cavity which is configured to the part which is to be molded. Typically, the mold is openable, or separable, so that the molded part can be removed from the mold cavity. A plastic material, such as polypropylene, polystyrene or the like, is injected, such as by a reciprocating screw arrangement, into the mold.

After the material has been allowed to cool or cure, the mold is opened and the molded part is ejected from the mold. The mold can then be closed and used for forming a subsequent part. It will be recognized by those skilled in the art that the mold pieces or halves must be clamped together and held sufficiently tight in order for the molded part to properly form. Gaps or openings in the mold seams may result in inadequately formed or disfigured parts which must be rejected or if possible recycled for reuse.

Certain types of molded parts, such as the aforementioned container closures, have openings therein, such as that used to pour a liquid from the container to which the closure is affixed. Such openings may be effected by using frangible panels formed in the closure which are removable upon initial opening of the container closure. The frangible panels may also include rings or other grasping members to facilitate removal of the panel. The closures may also include threads formed thereon to engage a cap for closing and sealing the container subsequent to initial opening.

In such cases, the mold includes an internal mandrel-like core element or sleeve around which the plastic material is molded to conform to the desired mold shape. The mandrel-like portion must, as part of the mold opening sequence, be removed from the molded part after the part is formed.

In known injection mold apparatus, removing the mandrel-like mold element is typically done by pulling or stripping the molded part from the mandrel as part of the mold opening sequence. This, however, may cause damage to the molded parts, particularly if the parts include threads or pull rings formed therein.

Thus, there continues to be a need for an injection molding apparatus which permits a staged, sequential separation of the mold to effect withdrawal of the inner sleeves or mandrels, which separation process eliminates the potential damage to the molded parts during the mold opening process.

SUMMARY OF THE INVENTION

A staged, sequentially separated injection molding apparatus for forming a molded container closure includes a mold base portion, a plurality of concentric, separable telescopic mold elements, and an opening therein defined by one of the base portion and the mold elements for injecting a mold material into the apparatus.

The elements are configured such that they can be separated or removed from the mold, from the inner most element outward, to provide sufficient free space for the newly molded part to flex inward as the mold elements are removed. The inward flexing of the part, permits ready removal of the next outwardly most mold element, while minimizing the possibility of damage to the molded part.

Each of the mold elements includes a mold face, which in conjunction with the base portion, in part defines a mold cavity. The inner and outer mold elements and an intermediate mold element include flange portions opposite of their respective mold faces.

The outer mold element includes an inner wall having at least one recess therein, and is configured to receive the intermediate mold element. The intermediate mold element has a hollow, elongated body portion which is receivable in the outer mold element. The elongated body portion has at least one opening therethrough which is adapted to coact with the recess in the outer mold element.

The inner mold element has an elongated body portion which is receivable in the intermediate mold element, and has at least one recess therein adapted to coact with the opening in the body portion of the intermediate mold element. The inner mold element includes a flange portion which is adapted to receive a strip bolt therein for moving the intermediate mold element relative to the outer mold element.

The mold includes at least one movable, locking cam member positioned in the opening in the intermediate mold element. Preferably, the cam member is a ball type bearing adapted to move between one of a first position wherein the cam member holds the intermediate mold element against movement relative to the outer mold element as the inner mold element is moved away from the base portion, and a second position wherein the intermediate element is movable with the strip bolt and the inner element relative to the base portion, to facilitate opening the mold for removal of the molded container closure.

In a current embodiment, the mold apparatus includes two intermediate mold elements positioned between the inner and outer mold elements. Each of the intermediate mold elements includes openings through their respective body portions adapted to receive a movable, locking ball bearing cam member therein.

Other features and advantages of the present invention will be apparent from the following detailed description, the accompanying drawings, and the appended claims.

DETAILED DESCRIPTION OF THE PREFERRED EMBODIMENTS

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

Figure 1:
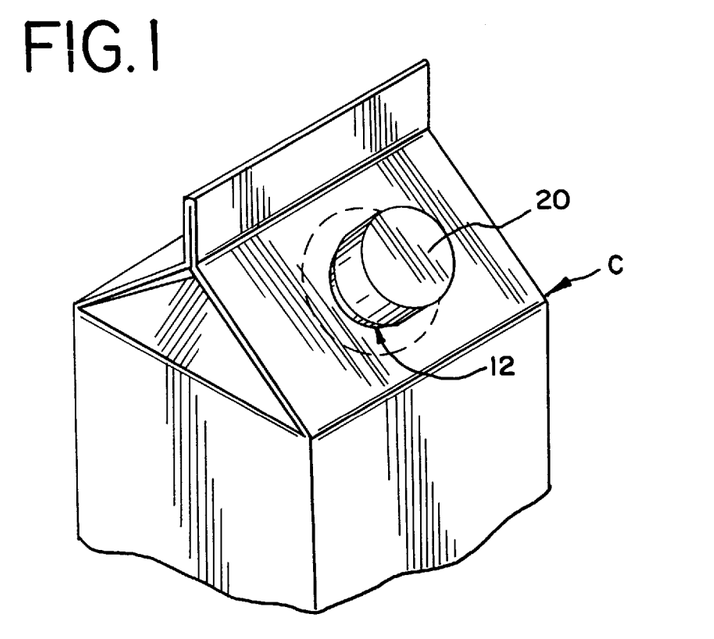
FIG. 1 is a perspective view of an exemplary closure formed using the staged, sequentially separated injection mold, in accordance with the principles of the present invention, the closure being illustrated affixed to a gable top container.
Figure 1A:
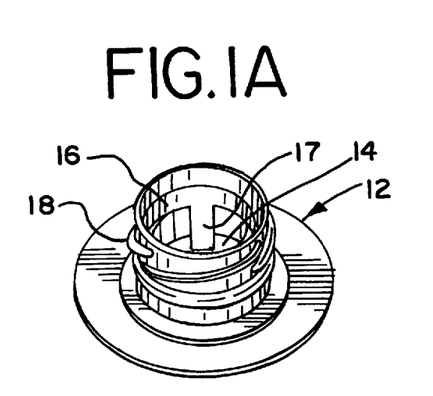
FIG. 1A is a perspective view of a closure which is formed in the staged, sequentially separated injection mold of the present invention.

Plastic closures, such as scalable spout 12 illustrated in FIGS. 1 and 1A, have come into widespread use for providing sealable spouts for containers, and particularly gable top containers C. The sealable spout 12 facilitates resealing the container C after initial opening, which, when used to store perishable contents, prolongs the freshness and life thereof. The sealable spout 12 may also be used with containers C for storing non-perishable contents, to facilitate dispensing the contents therefrom and for providing a leak resistant seal of the container C after initial opening.

The spout 12 may include a frangible inner panel 14 which is separable from the spout 12. In a current embodiment, the panel 14 includes a pull ring 16 which is formed with a tab or connecting member 17 integral with the panel 14 to facilitate removing the panel 14. The spout 12 also includes a peripheral base or flange, with a sidewall extending upwardly therefrom and having a thread formation 18 thereon to facilitate placement of a cap 20 on the spout 12. Upon initial opening of the container C, the pull ring 16 is grasped and pulled, separating the panel 14 from the spout 12. After initial opening of the container C, the cap 20 is readily threaded onto the spout 12 to reseal the container C.

It will be recognized by those skilled in the art that the various formations of the spout 12 may be difficult to properly form using an injection molding process. It will also be recognized that the thread formation 18 and the pull ring 16 may be even more difficult to retain in place, without damage, when forming such a spout 12 in an injection molding process, and, in particular, when separating the mold to remove the molded spout 12.

Figure 2:
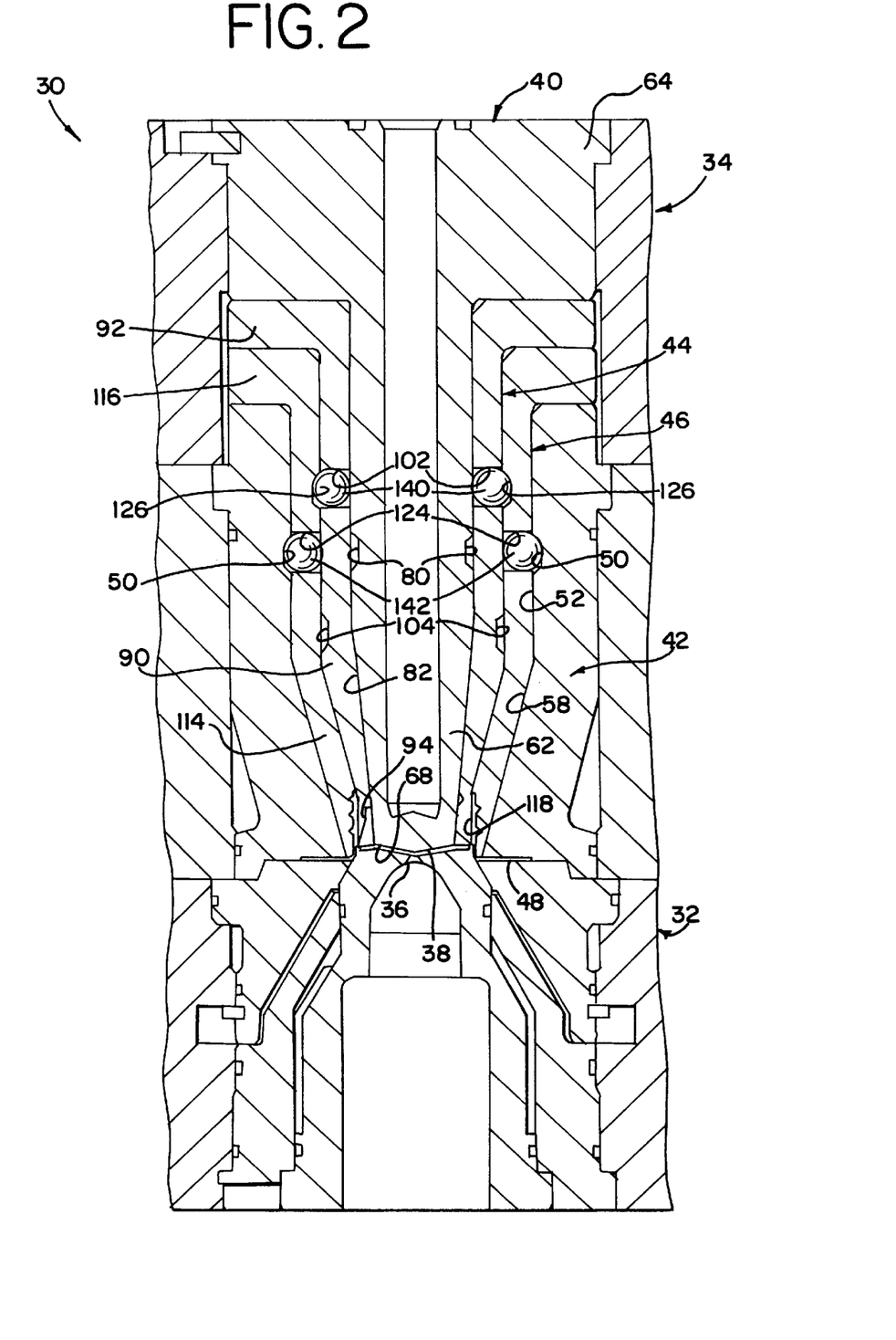
FIG. 2 is a cross-sectional view of the staged, sequentially separated injection mold apparatus, with the mold shown in the fully closed position, enlarged for clarity of illustration.

FIG. 2 illustrates a staged, sequentially separated injection mold apparatus 30, which facilitates forming of such a spout 12. In a current embodiment, the injection mold apparatus 30 includes a mold base portion 32 and a plurality of concentric, telescopic mold elements collectively designated 34. The mold base 32 and concentric elements 34 define an opening 36 (i.e., an injection gate) therein for injecting a moldable material into a mold cavity 38 which is likewise defined by the mold base 32 and concentric elements 34. The mold apparatus 30 is separable between the base portion 32 and the concentric elements 34 to remove or eject the newly molded part.

The mold cavity 38 is formed so as to define the particular shape which is desired to be formed. As such, in the current embodiment 30, the mold base 32 and concentric elements 34 are formed, such as by mechanical tooling and the like, to form the spout 12.

In a current embodiment of the apparatus 30, the concentric elements 34 include an inner mold element 40 and an outer mold element 42. Positioned between the inner and outer mold elements 40 and 42 are a first intermediate mold element 44 which is immediately outwardly adjacent to the inner mold element 40 and a second intermediate mold element 46 which is positioned between the first intermediate mold element 44 and the outer mold element 40.

Each of the mold elements 40, 42, 44 and 46 will now be described, with reference to FIG. 2. The outer mold element 42 has a mold face 48 on an end thereof which lies adjacent to and in spaced relation from the mold base portion 32. The mold face 48, in conjunction with the mold base 32 defines, in part, the mold cavity 38.

The outer mold element 42 further includes an annular recess 50 formed on an inner surface 52 thereof. In a preferred embodiment, the recess 50 has tapered upper and lower walls. The inner surface 52 may also be inwardly tapered, as indicated at 58, to facilitate the sequenced separation and assembly of the concentric elements 34.

The inner mold element 40 is the central element of the concentric elements 34. The inner mold element 40 includes an elongated body portion 62 which is receivable in the first intermediate mold element 44. A flange portion 64 extends outwardly from the body portion 62 at one end thereof. The inner element includes a mold face 68 on an end opposite of the flange 64. The mold face 68, in conjunction with the base portion 32, further defines the mold cavity 38. Additionally, inner element 44, together with first intermediate mold element 40, defines the portion of the mold cavity within which pull ring 16 of spout 12 is formed.

Figures 3A, 3B:
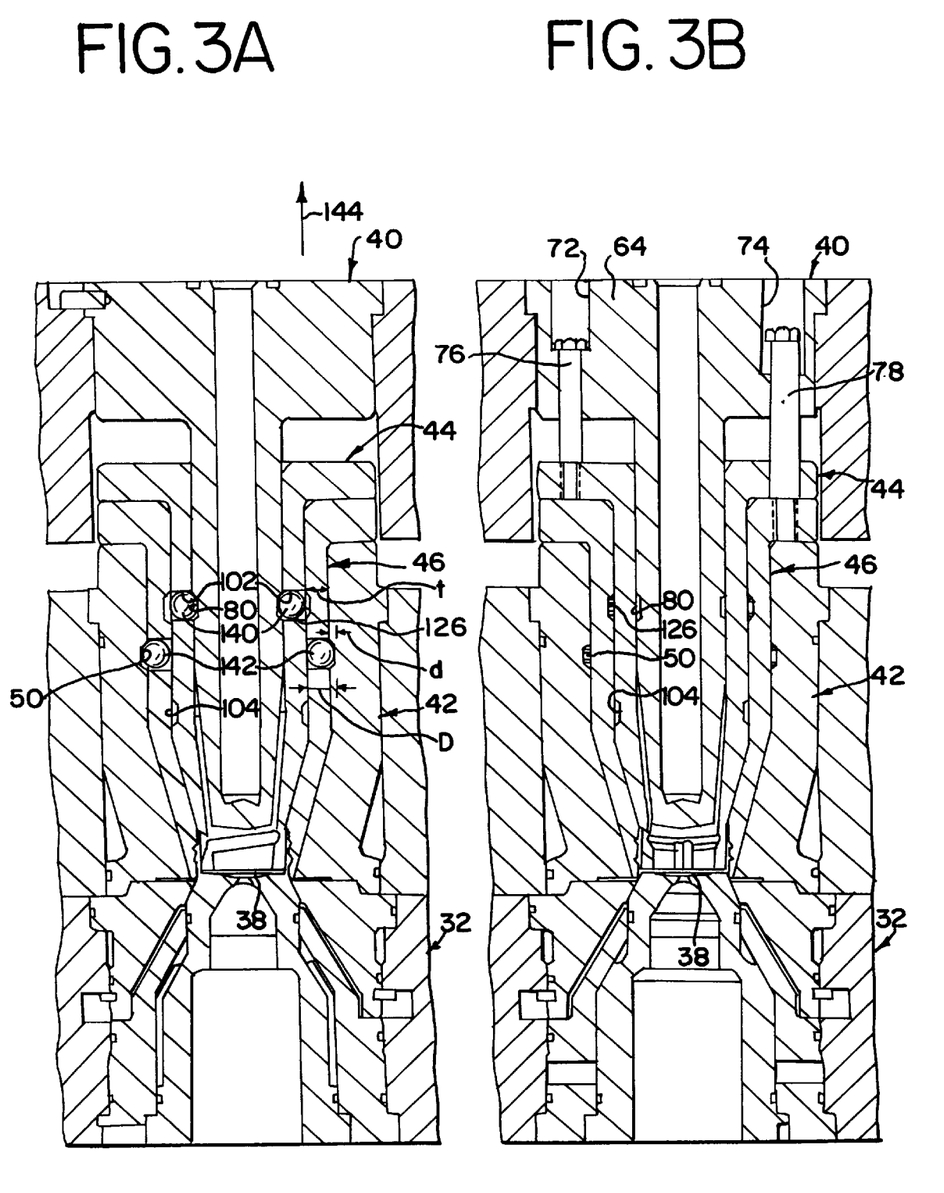
FIGS. 3A and 3B are cross-sectional views similar to FIGS. 2A and 2B, with the mold shown at the first stage of the sequenced separation, with the inner mold element fully withdrawn.

As best seen in FIG. 3B, the flange portion 64 includes first and second stepped bores 72, 74 therein which are adapted to slidingly receive first and second strip bolts 76, 78. The strip bolts 76, 78, are associated with the first and second intermediate mold elements 44, 46, respectively, for facilitating the staged, sequential separation of the mold 30.

Referring again to FIG. 2, the inner mold element 40 further includes an annular recess 80 formed in an outer wall 82 thereof. The recess 80 may include inwardly tapered upper and lower walls. The outer wall 82 may be inwardly tapered, as illustrated, to facilitate the sequenced separation and assembly of the concentric elements 34.

The first intermediate mold element 44 is positioned immediately outwardly adjacent to the inner mold element 40, and has an elongated, hollow body portion 90, adapted to receive the inner element 40. A flange portion 92 extends outwardly from the body 90 and abuts the inner element 40 flange 64 when the elements 40, 44 are in the closed position, as illustrated in FIG. 2. The first intermediate element 44 includes a mold face 94 on an end opposite of the flange 92. The mold face 94, in conjunction with the base portion 32 further defines the mold cavity 38.

Figures 2A, 2B:
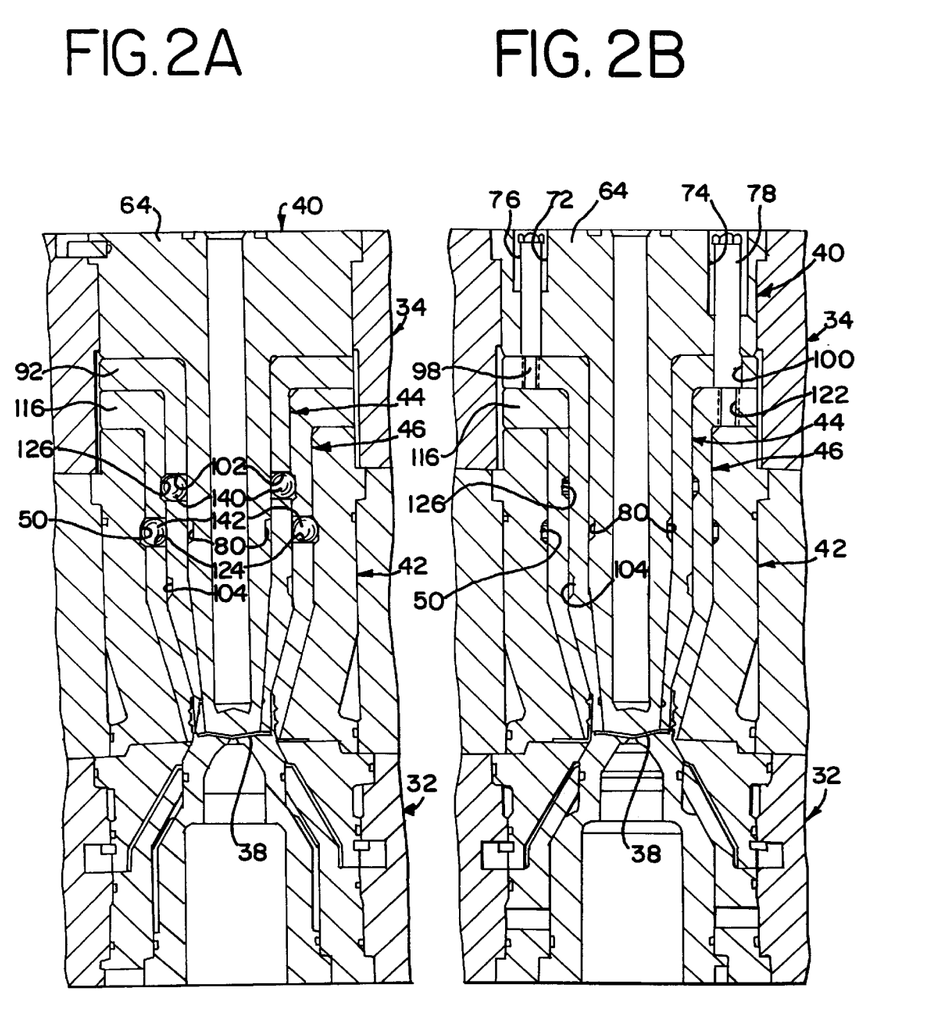
FIGS. 2A and 2B are cross-sectional views, taken at 90° one from the other, of the staged, sequentially separated injection mold apparatus, with the mold shown in the fully closed position, as illustrated in FIG. 2.

As best seen in FIG. 2B, the first intermediate member flange portion 92 includes a threaded bore 98 therein for threadedly engaging the first strip bolt 76 and an open bore 100 therethrough for slidably receiving the second strip bolt 78. The bores 98, 100 correspond to the stepped bores 72, 74 in the inner mold element flange portion 64.

The first intermediate mold element 44 further includes a pair openings 102 through the body portion 90, generally transverse thereto. The openings are configured to coact with the inner element recesses 80. The body portion 90 also includes an annular recess 104 in an outer wall 106 thereof. The recess may include tapered upper and lower walls, and the outer wall 106 may be inwardly tapered. As will be described herein, the openings 102 and recess 104 are adapted to coact with the immediately adjacent elements to facilitate the sequenced separation of the concentric elements 34.

In a current embodiment, the mold 30 includes a second intermediate mold element 46. It will be recognized by those skilled in the art that any number of intermediate mold elements may be positioned between the inner and outer mold elements to effect the desired mold form. Such varied number of mold elements are intended to be within the scope of the present invention.

The second intermediate mold element 46 is configured similar to the first intermediate element 44, and is positioned between the first element 44 and the outer element 42. The second intermediate element 46 includes an elongated, hollow body portion 114 adapted to receive the first intermediate element 44. A flange portion 116 extends outwardly from an end thereof, abutting the flange portion 92 of the first intermediate element 44 when the elements are in the closed position as illustrated in FIG. 2.

The second intermediate element includes a mold face 118 at an end thereof opposite of the flange 116. The mold face 118, in conjunction with the base portion 32 further defines the mold cavity 38, and in the illustrated embodiment defines a thread formation to form the thread formation 18 of the spout 12. A threaded bore 122 (FIG. 2b) in the flange 116 corresponds to the second stepped bore 74 and the open bore 100 of the inner and first intermediate elements 40, 44, respectively. The threaded bore is adapted to receive the second strip bolt 78.

Similar to the first intermediate element 42, the second intermediate element includes a pair openings 124 through the body portion 114, generally transverse thereto. The openings 124 are configured to coact with the first intermediate element recesses 104 and the outer element recesses 50. The body portion 114 also includes an annular recess 126 in an inter wall thereof. The recess 126 may include tapered upper and lower walls, and the outer wall and inner wall of the body portion 114 may be inwardly tapered. As will be described herein, the openings 124 and recess 126 are adapted to coact with the immediately adjacent elements to facilitate the sequenced separation and assembly of the concentric elements 34.

Movable, locking cam members, such as the illustrated ball-type bearings 140, 142, are positioned in each of the openings 102, 124 of the first and second intermediate mold elements 44, 46. The bearings 140, 142 move through their respective openings 102, 124, and coact with recesses 80, 126 and 50, 104 of their respective, immediately adjacent elements 44, 40 and 42, 46. The bearings 140, 142 have a diameter D which is greater than the thickness t of the hollow intermediate element walls, by about the depth d of the recesses 50, 80, 104, 126. In this manner, as will be described below, the elements are held together when the openings and recesses of immediately adjacent elements are in alignment with each other, with the bearing therebetween. Conversely, when the openings and recesses of immediately adjacent elements are not in alignment with each other, or when the bearings 140, 142 are positioned so as to traverse through openings 102, 124, away from their respective recesses, the elements are separable, one from the other.

In a molding process, the part, such as the spout 12, is formed with the mold in the closed position as illustrated in FIGS. 2A and 2B. After a period of time sufficient for the part to cool and solidify, the mold is ready to be separated and the part ejected from the mold 30. During the mold separation stages, it is of utmost importance that the forces exerted on the part from the separating mold 30 are minimized to reduce the possibility of damage to the newly molded part.

In the first stage of separation, the inner mold element 40 is pulled upwardly from the mold base portion 32, in the direction as indicated by the arrow at 144. As the element 40 is moved upwardly, the bearings 140 are held in place in the openings 102, extending into recess 126, which prevents movement of, or holds, the first intermediate element 44, relative to the second intermediate element 46. Likewise, the bearings 142 are held in place in the openings 124 extending into recess 50, which prevents movement of, or holds, the second intermediate element 46 relative to the outer element 42. Thus, while the inner element 40 is separated from the base portion 32, the first and second intermediate elements 44, 46 are held in place relative to each other and relative to the outer element 42, by the coaction of the locking bearings 140, 142 moving through their respective openings 102, 124 and engaging the recesses 126, 50 in their immediately outwardly adjacent mold elements 46, 42.

The completion of the first stage of separation is illustrated in FIGS. 3A and 3B. As is readily seen, the inner mold element 40 is fully withdrawn from the mold base 32. When the apparatus is used to mold a part such as spout 12, the inner mold element is thus withdrawn from within the pull ring 16 of the spout. The first intermediate element 44, the second intermediate element 46 and the outer element 42 are in the closed position. At this point, the bearings 140 can shift through their respective openings 102, disengaging recess 126, and become engageable with recess 80.

Figures 5A, 5B:
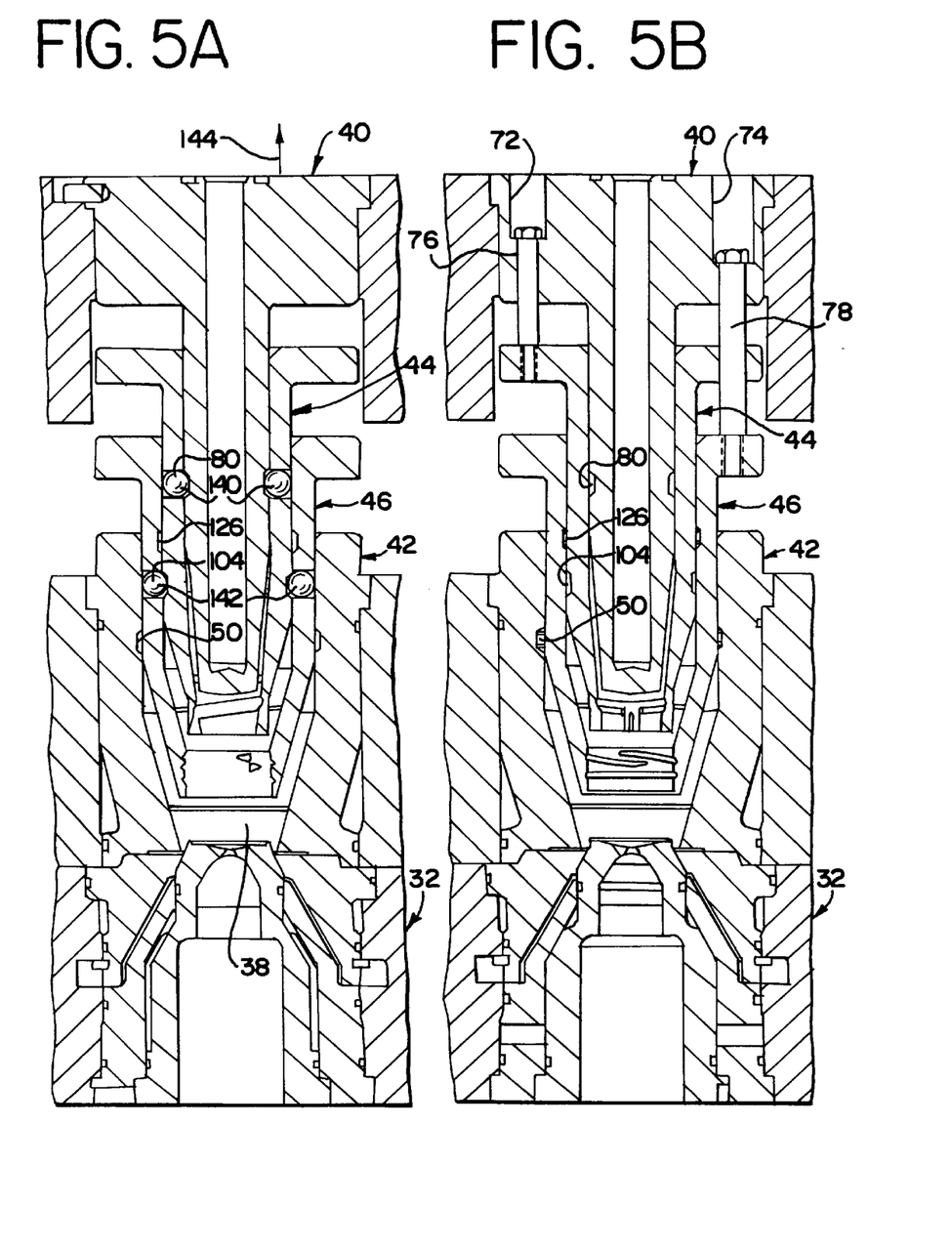
FIGS. 5A and 5B are cross-sectional views similar to FIGS. 2A and 2B, with the mold shown at the third stage of the sequenced separation, with the inner, first and second intermediate mold elements withdrawn.

Continued upward force on the inner element 40, as indicated by the arrow at 144 commences the second stage of separation, as illustrated in FIGS. 5A and 5B. The continued upward movement of inner mold element 40 causes the strip bolt 76 to engage the stepped bore 72, which in turn commences separation of the first intermediate element 44 from the base portion 32.

Figure 4A:
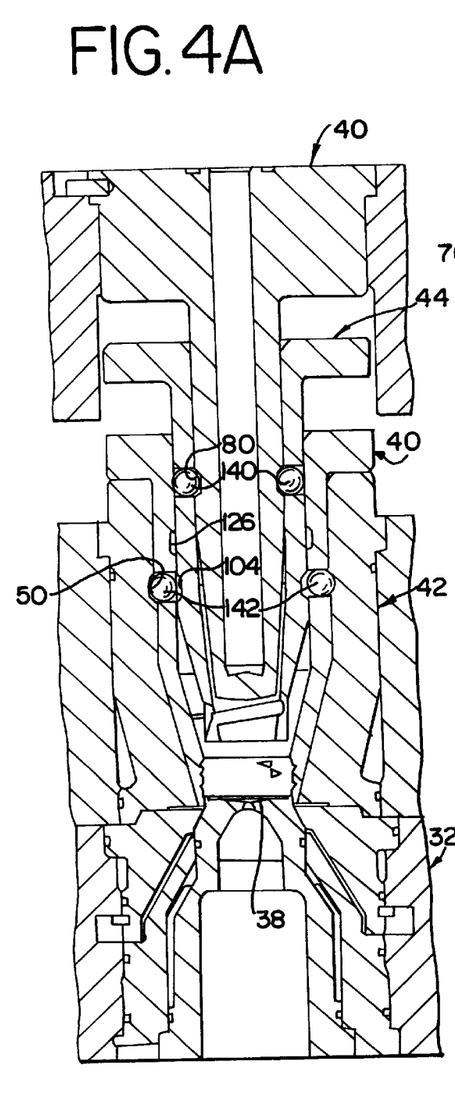
FIGS. 4A and 4B are cross-sectional views similar to FIGS. 2A and 2B, with the mold shown at the second stage of the sequenced separation, with the inner and first intermediate mold elements withdrawn.
Figure 4B:
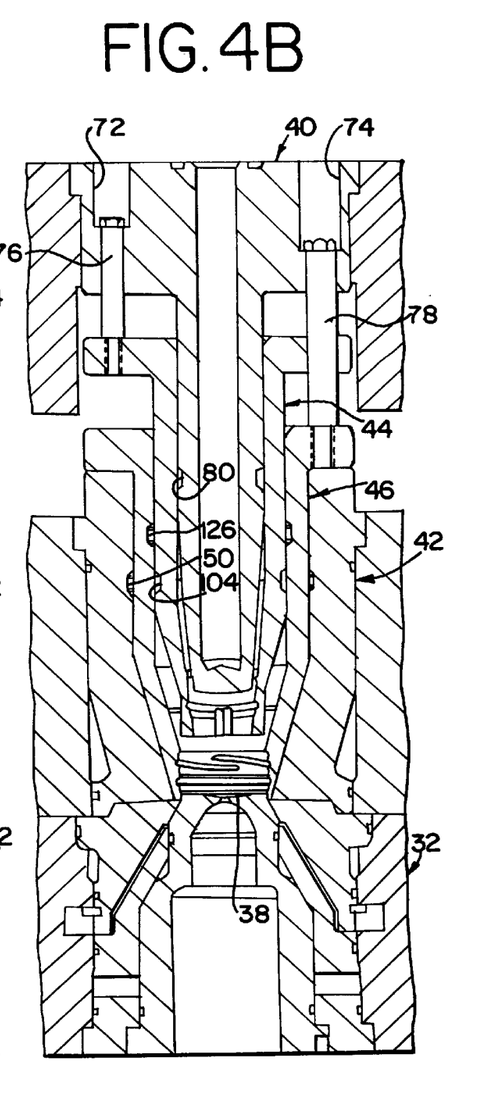

The mold 30 is configured such that when the strip bolt 76 contacts the bore 72 base, the recesses 80 in the inner element 40 are in alignment with the openings 102, thus allowing the movable bearing 140 to move or shift inwardly from a first position (illustrated in FIG. 2A) wherein the first intermediate element 44 is held in place relative to the second intermediate element 46, to a second position (illustrated in FIGS. 4A) wherein the bearings 140 extend into recess 80, freeing the first intermediate element 44 relative to the second intermediate element 46 and holding the first intermediate element 44 relative to the inner element 40. Bearings 142 remain in position within recess 50 of outer mold element 42, thus preventing movement of the second intermediate mold element 46 upwardly with first intermediate element 44'. When molding spout 12, this stage in the mold-opening sequence permits pull ring 16 to flex inwardly of the mold surfaces of first intermediate mold element 44 against which the pull ring is formed.

The third stage of separation is illustrated in FIGS. 5A and 5B. The inner mold element 40 and the first intermediate element 44 are fully withdrawn from the mold base 32. The second intermediate element 46 is partially withdrawn. Continued upward movement as indicated by the arrow at 144 causes the second strip bolt 78 to engage the second stepped bore 74. This transfers the upward force and movement from the inner element 40 to the second intermediate element 46.

The mold 30 is configured such that when the strip bolt 78 contacts the bore 74, the recesses 80 in the inner element 40 remain in alignment with the openings 102. In addition, the recesses 104 in the first intermediate element 44 come into alignment with the openings 124, thus allowing the movable bearings 142 to move from a first position (illustrated in FIG. 4A, in engagement with recess 50) wherein the second intermediate element 46 is held in place relative to the outer element 42, to a second position (illustrated in FIG. 5A) wherein the bearings 142 extend into recesses 104, freeing the second intermediate element 46 relative to the outer element 42. Thus, the inner 40, and first and second intermediate elements 44 and 46, are released from the outer element 42.

By virtue of the clearance provided inwardly of the sidewall of the spout 12 that can be formed in the present apparatus, separation of second intermediate mold element 46 is effected without unacceptable damage to the thread formation 18 of the spout. The sidewall of the spout can flex inwardly, even as the peripheral flange of the spout is held between outer mold element 42 and mold base 32.

Figure 6A:
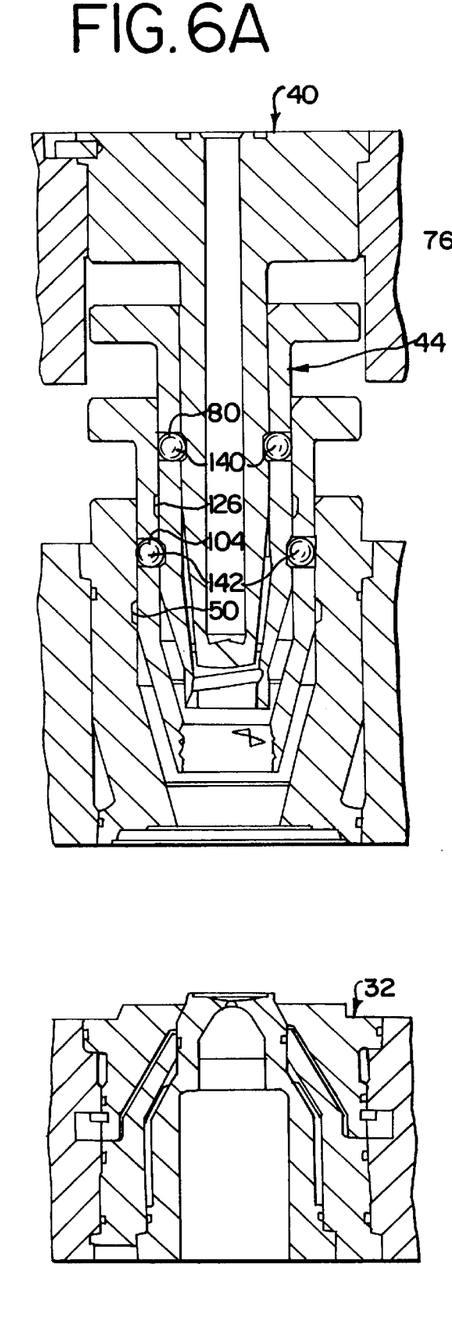
FIGS. 6A and 6B are cross-sectional views similar to FIGS. 2A and 2B, with the mold shown at the final stage of the sequenced separation, with the mold elements withdrawn and the mold base portion separated therefrom.
Figure 6B:
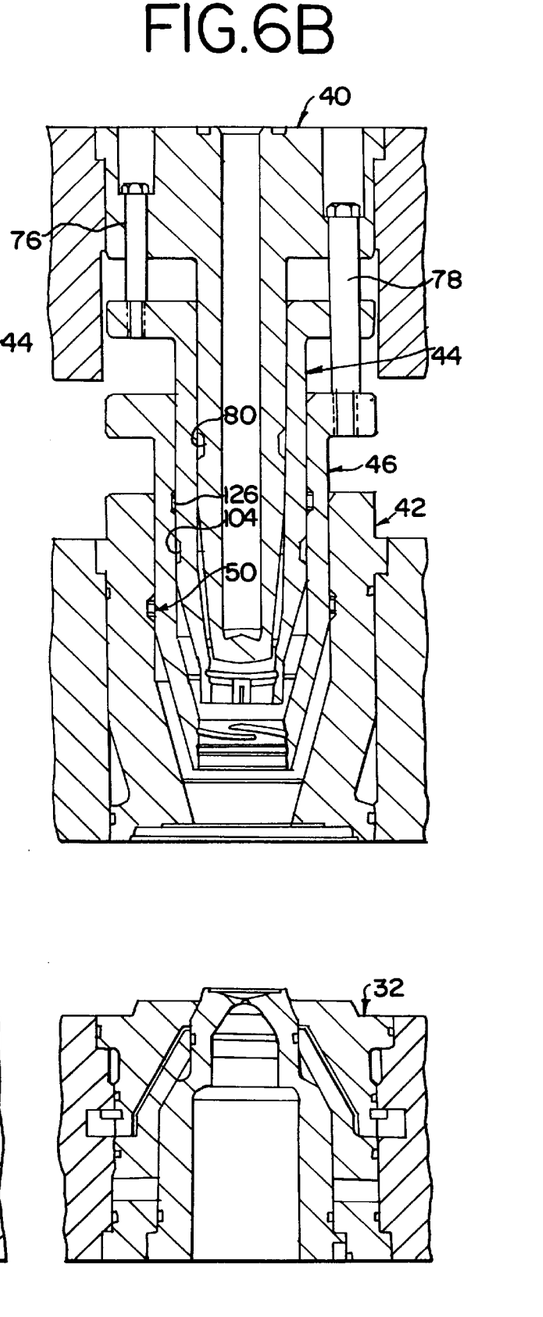

The final stage of separation is illustrated in FIGS. 6A and 6B. In the final stage of separation, the concentric elements 34, i.e., the inner mold element 40 and the first and second intermediate mold elements 44 and 46, are separated from the mold base 32. The part can then be removed or ejected from the mold 30.

The present invention provides an advantageous, sequentially staged apparatus for separating the mold elements of an injection molding apparatus to prevent damage to the newly molded part. The apparatus uses a combination of movable locking cam members which traverse though their respective intermediate mold elements and either lock or free each of the elements relative to their immediately adjacent elements.

In this manner, the elements can be separated or removed from the mold, from the inner most element outward, to provide sufficient free space for the newly molded part to flex inward as the mold elements are removed. The inward flexing of the part, permits ready removal of the next outwardly most mold element, while minimizing the possibility of damage to the molded part.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A method of molding a container spout having a base and a sidewall extending upwardly therefrom with a thread formation on the sidewall, and a removable panel positioned within said sidewall and including a pull ring, comprising the steps of:

providing a mold assembly including a mold base, and a plurality of telescopic mold elements, said telescopic mold elements including an inner mold element, a first intermediate mold element positioned outwardly of said inner element, a second intermediate mold element positioned outwardly of said first intermediate element, and an outer mold element positioned outwardly of said second intermediate element;

positioning said telescopic mold elements and said mold base together to define a mold cavity for molding said container spout, and filling said mold cavity with moldable material to mold said container spout;

moving said inner mold element away from said mold base while locking said intermediate mold elements against movement relative to said outer mold element, so that said inner mold element is moved from within the pull ring of said molded container spout;

moving said inner mold element and said first intermediate mold element away from said mold base while locking said second intermediate mold element against movement relative to said outer mold element, so that said first intermediate mold element is moved from within the sidewall of said molded container spout;

moving said inner mold element and said intermediate mold elements away from said mold base so that said second intermediate mold element is moved off of the thread formation of said molded container spout as said sidewall of said spout flexes inwardly; and moving said outer mold element away from said mold base to release said base of said molded container spout from therebetween.

2. The method of molding a container spout in accordance with claim 1, wherein said step of moving said inner mold element away from said mold base while locking said intermediate mold elements includes providing at least one locking member movable between a first position wherein said locking member holds at least one of said intermediate mold elements against movement relative to said outer mold element, and a second position wherein at least one of said intermediate mold elements is movable with said inner mold element relative to said outer mold element.

3. The method of molding a container spout in accordance with claim 2, wherein said step of providing said locking member includes providing an opening in at least one of said intermediate molding elements, and positioning said locking member in said opening for movement between said first and second positions thereof.

4. The method of molding a container spout in accordance with claim 1, wherein said step of moving said inner mold element away from said mold base while locking said intermediate mold element against movement relative to said outer mold element includes providing a first locking member movable relative to said first intermediate mold element between a first position wherein said first locking member holds said first intermediate mold element against movement relative to said outer mold element as said inner mold element is moved away from said mold base, and a second position wherein said first intermediate mold element is movable with said inner mold element relative to said mold base.

5. The method of molding a container spout in accordance with claim 4, wherein said step of moving said inner mold element and said first intermediate mold element away from said mold base includes providing a second locking member movable relative to said second intermediate mold element between a first position wherein said first locking member holds said second intermediate mold element against movement relative to said mold and a second position wherein said second intermediate mold element is movable with said inner mold element and said first intermediate mold element relative to said mold base.

6. The method of molding a container spout in accordance with claim 5, wherein said first and second locking members each comprise a ball bearing.

\* \* \* \* \*